(12) United States Patent
Bocciolone et al.

(10) Patent No.: US 10,260,975 B2
(45) Date of Patent: Apr. 16, 2019

(54) DEVICE FOR PRESSURE MEASUREMENTS ON YACHT SAILS

(71) Applicants: POLITECNICO DI MILANO, Milan (IT); FONDAZIONE CARIPLO, Milan (IT); Elena Angela Tosarini, Cesano Maderno MB (IT)

(72) Inventors: Marco Francesco Bocciolone, Milan (IT); Marco Belloli, Milan (IT); Sara Muggiasca, Milan (IT); Fabio Vittorio Fossati, Milan (IT); Ilmas Andrea Bayati, Milan (IT)

(73) Assignees: POLITECNICO DI MILANO, Milan (IT); FONDAZIONE CARIPLO, Milan (IT)

( * ) Notice: Subject to any disclaimer, the term of this patent is extended or adjusted under 35 U.S.C. 154(b) by 119 days.

(21) Appl. No.: 15/462,621

(22) Filed: Mar. 17, 2017

(65) Prior Publication Data
US 2018/0266906 A1    Sep. 20, 2018

(51) Int. Cl.
| | | |
|---|---|---|
| *G01M 9/04* | (2006.01) | |
| *G01P 13/02* | (2006.01) | |
| *G01L 9/00* | (2006.01) | |
| *G01P 1/08* | (2006.01) | |
| *B63H 9/04* | (2006.01) | |

(52) U.S. Cl.
CPC ............ *G01L 9/0052* (2013.01); *G01M 9/04* (2013.01); *G01P 1/08* (2013.01); *G01P 13/02* (2013.01); *B63H 9/04* (2013.01)

(58) Field of Classification Search
CPC ........ G01P 13/025; G01P 13/02; G01P 5/165; G01P 5/14; G01P 5/02; G01P 13/0013; G01P 13/0066; G01P 5/005; G01P 5/06; G01P 5/07; G01P 5/16; G01P 13/006; G01P 13/045; G01P 21/025; G01P 5/12; G01P 5/18; G01P 5/20; G01P 5/26; G01P 13/00; G01P 13/0006; G01P 13/002; G01P 13/0033; G01P 13/0073; G01P 21/00; G01P 3/62; G01P 5/00; G01P 5/001; G01P 5/04; G01P 5/175; G01P 5/24; G01P 5/245; G01P 5/247; G01M 9/06; G01M 9/062; G01M 9/04; G01M 9/065; G01M 9/067; G01M 9/08
See application file for complete search history.

(56) References Cited

U.S. PATENT DOCUMENTS

| | | | | |
|---|---|---|---|---|
| 6,308,649 | B1 * | 10/2001 | Gedeon | B63B 49/00 114/39.11 |
| 2002/0121146 | A1 * | 9/2002 | Manaresi | B63H 9/06 73/862.68 |
| 2010/0138171 | A1 * | 6/2010 | George | B63H 9/0642 702/50 |

OTHER PUBLICATIONS

Fossati et al., "A novel full scale laboratory for yacht engineering research" Ocean Engineering, 2015, v 104, p. 219-237.
(Continued)

*Primary Examiner* — Andre J Allen
(74) *Attorney, Agent, or Firm* — Greer, Burns & Crain, LTD.; Gregory P. Einhorn (57) ABSTRACT

The present invention discloses a system for measuring pressure on a sail comprising: a) at least one pressure electronic scanner; b) at least one pressure sensor positioned on the sail; c) pneumatic means for connecting said at least one pressure scanner to said at least one pressure sensor positioned on the sail, wherein said connecting means is a pressure strip.

18 Claims, 8 Drawing Sheets

(56) References Cited

OTHER PUBLICATIONS

Fossati et al., "Experimental Investigation of Sail Aerodynamic Behavior in Dynamic Conditions" 2010, p. 327-367.
Motta et al., "Experimental investigation of asymmetric spinnaker aerodynamics using pressure and sail shape measurements," Ocean Engineering, 2014, v 90, p. 104-118.
Pelley et al., "Aerodynamic Force Deduction on Yacht Sails Using Pressure and Shape Measurements in Real Time" 4th High Performance Yacht Design Conference, Aukland, Mar. 12-14, 2012, p. 28-37.
Lozej et al., "Pressure distribution on sail surfaces in real sailing conditions" 4th High Performance Yacht Design Conference, Aukland, Mar. 12-14, 2012.
Viola et al., "Sail pressures from full-scale,wind-tunnel and numerical investigations" Ocean Engineering, 2011, v 38, p. 1733-1743.
Fossati et al., "Wind Tunnel Techniques for Investigation and Optimization of Sailing Yachts Aerodynamics" 2nd High Performance Yacht Design Conference, Aukland, Feb. 14-16, 2006.
Fossati et al., "Offwind Sail Flying Shapes Detection" 5th High Performance Yacht Design Conference, Aukland, Mar. 10-12, 2015.
Fossati et al., "Experimental Database of Sails Performance and Flying Shapes in Upwind Conditions" CIRIVE Wind Tunnel, Politecnico di Milano, Italy.
Bot et al., "Wind-tunnel pressure measurements on model-scale rigid downwind sails" Ocean Engineering, 2014, v 90, p. 84-92.
Motta et al., "An Investigation of the Dynamic Behaviour of Asymmetric Spinnakers At Full-Scale" 5th High Performance Yacht Design Conference, Aukland, Mar. 10-12, 2015.
Deparday et al., "Dynamic Measurements of Pressures, Sail Shape and Forces on a Fullscale Spinnaker."
Viola et al., "On-Water Pressure Measurements on a Modern Asymmetric Spinnaker," Proceedings of the 21st International Hiswa Symposium on Yacht Design and Yacht Construction, Nov. 15-16,2010, Amsterdam, The Netherlands.

* cited by examiner

DEVICE FOR PRESSURE MEASUREMENTS ON YACHT SAILS

The present invention relates to the field of ship building, in particular ships propelled by sails, more in particular to sail design.

The present invention discloses a sail pressure measurement system based on MEMS sensors and pressure strips and pads technology. The system is capable to give differential measurement between the leeward and windward side of the sails.

BACKGROUND OF THE INVENTION

The possibility of knowing the effective pressure distribution over the sail plan is of great interest for the aerodynamic and structural design of sails and for the selection and the optimal use of materials and production techniques. Integral measurements alone may not be sufficient in understanding how a sail plan can be optimized on specific purposes, if any information about the complex local fluid-structure interaction are provided.

In the last few years there has been a revival of pressure measurements on yacht sails and recently several contributions can be found in literature aiming to assess sail pressure distribution detection ([1-8]). The systems disclosed in the literature are generally set-up of scientific type and are too complex for a commercial application. Moreover, these systems are too invasive.

U.S. Pat. No. 6,826,968 discloses a device for detecting pressure at different points of a sail comprising a complex array of pressure sensing pixel capacitors arranged in two orthogonal sets of electrodes.

WO200573078 discloses an apparatus comprising two distinct measuring devices, placed windward and leeward respectively Another system for measuring pressure on both sides of the sail is mentioned in GB2349699, but structural and functional details are not provided.

Therefore, there is the need of a system for measuring pressure on sails which is simple and suitable for commercial purposes and of low invasive impact on the sails.

There is also the need of a system capable of measuring pressure distribution on the sails at full scale.

A further need is for a system which is operable in operating conditions, namely outside laboratory environment, in particular outdoor.

DISCLOSURE OF THE INVENTION

It has been found a system for measuring pressure on the sail surface capable of working on the sails at full scale and in operating conditions, namely outdoor.

The system according to the present invention comprises:
a) at least one pressure scanner;
b) at least one pressure sensor positioned on the sail;
c) pneumatic means for connecting said at least one pressure scanner to said at least one pressure sensor positioned on the sail, wherein said connecting means are pressure strips.

The pressure distribution on the sails is carried out by means of MEMS (Micre-Electro-Mechanical System) sensors and dedicated pressure strips and pads which have been designed and produced aiming to provide the differential measurement between the sail leeward and windward side.

The pressure sensors are designed and built to provide the differential measurement between the measurement point and a reference pressure value which can be supplied by the user.

In the following a detailed description of the pressure scanners will be provided, as well as of the other main components of the system.

DETAILED DISCLOSURE OF THE INVENTION

Pressure Strips Scanner Description

The pressure scanner is any kind of pressure scanner suitable for the purpose of the present invention and this kind of scanner is well-known in the art. In particular, a scanner using piezo-resistive sensors is preferred. The pressure scanner preferably comprises more than one sensor, preferably up to 16 sensors or more.

In an exemplary embodiment, the scanner is a commercially available CSEM C16 scanner. This scanner is a miniaturized electronic pressure scanner in a slim, lightweight and waterproof package. It provides 16 differential pressure sensors and a CAN bus interface for the communication. Conveniently, dimensions and shape of the scanner box are selected to fit the system of the invention. For example, the scanner height, of only 6 mm and of the limited weight of 50 g, has minimal impact on the airflow, which makes it possible to place the scanner directly in a custom built sleeve close to the actual measurement section on the sails. Each of the 16 sensors has its own reference input which makes the scanner especially suited for measuring the pressure difference between leeward and windward side on dedicated spots on the sails.

As said, a single scanner has 16 channels, each of which equipped with a dedicated sensor capable of measuring differential pressures in the range of ±1000 Pa thanks to a new generation of piezo-resistive differential low-pressure dies. Besides their measuring accuracy, even in ranges much lower than their full-scale (resolution of 0.01% FS), these types of scanners are suitable also for their slim, lightweight and waterproof packages.

The differential measurements of sensors might be performed between the pressure of interest at a certain location and a reference pressure taken in the undisturbed flow or directly measuring the differential pressures between windward and leeward sides of the sail. In order to produce these different outputs, the same scanners can be equipped with two distinctive pressure flange systems: one refers the 16 pressures measured from the as many channels to a single reference pressure while the other provides 32 tubes, two per pressure sensor, one facing to the windward and the other to the leeward side of the sail. The configuration with a common reference pressure is well-suited for wind tunnel applications since is fairly simple to measure the upstream pressure with a simple Pitot-tube, whereas the differential measurement is extremely practical in full-scale experiments where, on the contrary, is rather difficult to locate measuring devices on board in areas without flow disturbance from the sail plan.

On the opposite side of the scanner box, it is located the plug-in for the CAN cable that supplies the scanner with electrical power, allows remote access to the scanner configuration commands and transmits the measurement data to the receiving computer. This CAN interface (CAN 2.0A), suitable for a network of scanners much larger than the ones actually used, has been preferred over a wireless solution due to its robust data transmission capability, the guaranteed data rate of 1 Mbit/s and the possibility of direct power supply, avoiding embedded batteries that would have drastically increased the overall scanner weight.

The commercial MEMS pressure dies, integrated in the scanner, are a new generation of piezo-resistive differential low-pressure dies to reach very low full scale ranges below 1000 Pa. Despite the die size of only 2×2×0.5 mm, that is much smaller than traditional low-pressure dies, it provides improved zero-stability, reduced g-sensitivity and reduced sensitivity to humidity. This added stability permits use with added amplification to achieve accurate performance in ranges much lower than its nominal 1000 Pa rating. The key specification of the scanner is given in Table 1.

| Parameter | C16 | Unit |
| --- | --- | --- |
| FS pressure range | ±1000 | Pa |
| Number of pressure inputs | 16 | |
| Number of reference inputs | 16 | |
| Measurement resolution | 0.01 | % FS |
| Static accuracy after zeroing | 0.25 | % FS |
| Total thermal error | 0.01 | % FS/° C. |
| Sample rate | 1-100 | Hz |
| Input voltage | 12 | V |
| Operation current | 60 | mA |
| Communication CAN Interface | 1 | Mbit/s |
| Maximal CAN cable length | 40 | m |
| Internal flash data memory size | 8 | Mbit |
| Operating temperature range | −10 to 70 | ° C. |
| Size | 65 × 55 × 6 | mm |
| Weight | 50 | gram |

The MEMS sensors are cost efficiently bonded to a FR4 substrate using die bonding techniques based on elastic adhesives. The sensors are packaged in a sensor array with minimal air cavity to ensure optimal performance in combination with the micro-channels of the pressure strips.

A dedicated pressure flange system makes the scanner compatible with either the pressure strips or with standard tubing. Three different pressure adapters have been developed, which can be screwed to the scanner. The first adapter provides 32 tubes (2 per pressure sensor, one facing to the front side and one to the reference side of the sensor). A second adapter combines all reference inputs to a single tube, in order to connect all MEMS sensors to the same reference. Finally, the third adapter provides direct access to the pressure strips without the need of any tubes.

Figure 1:
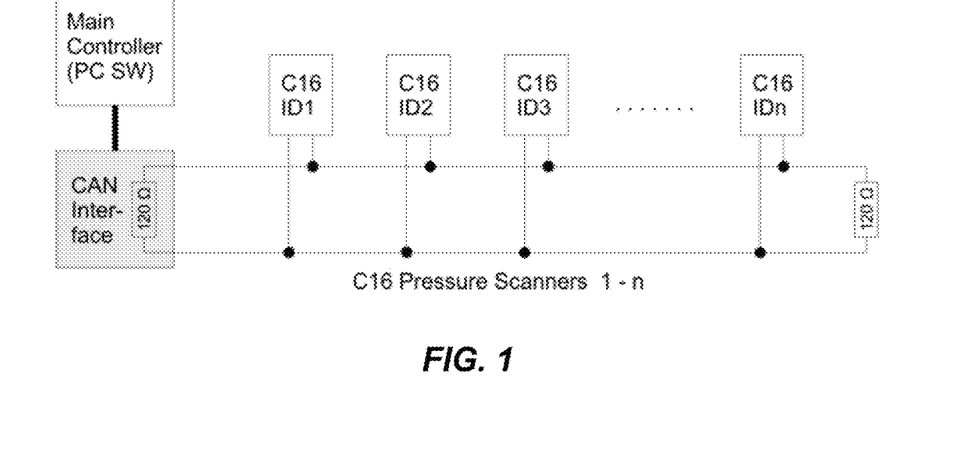
FIG. 1 shows CAN bus topology.

The scanner C16 supports a standard CAN (Controller Area Network) interface (CAN 2.0A) with a CAN protocol, allowing remote access to the essential commands required when integrating the unit into an instrumentation system. The serial CAN bus topology (FIG. 1) allows for up to 128 scanners in a single network. Preferably, the number of scanners per network should be below 16 (i.e. 256 pressure sensors) in order to reduce the data traffic on the bus and to guarantee synchronized data sampling.

The CAN interface has been preferred over a wireless solution due to its robust data transmission capability, the guaranteed data rate of 1 Mbit per second and the possibility to directly supply electrical power to the scanners via the flat CAN cable. Thus, no battery is required in the scanner which reduces both, the dimensions and the overall weight of the scanners. All measurement data and configuration commands are sent over the CAN interface. A correctly received command is always acknowledged by the scanner with the transmission of a response message.

Two basic data sampling approaches are supported either autonomous sampling or master sampling. The desired option can be configured and stored in the configuration flash. In auto sampling mode each scanner in the network generates its own sample timing according to a programmed sample rate and transmits the measurement data of each sample to the CAN bus autonomously. The measurement data can be collected on-line or can be stored in the internal flash of the scanner and downloaded off-line after the measurement session.

In master sampling mode the user programmed instrumentation system (SW running on PC or Laptop) acts as sample master and broadcasts each sample start with a SINGLE_SHOT sample command. All scanners in the network receive the sample command at the same time and start the measurement immediately and synchronously. Each scanner writes the measurement data to the CAN bus following a bus collision avoidance protocol. The master collects the response messages of all active scanners in the CAN network, and initiates the next sample according to the desired sample rate. The master sampling mode has the advantage that all scanners connected to the CAN bus are synchronized by the master, even over a long sample period of several hours. The 16 sensors of each scanner are sampled sequentially with an internal scan rate of up to 4 kHz. Hence in master sampling mode all sensors in the CAN network can be sampled nearly synchronous within 4 ms.

Pressure Strips Technology

The pressure strip system according to the present invention is suited for aerodynamics testing for models in a wind tunnel. Its main advantage is the light weight and thin, flexible foil appearance which allows non-invasive application to the test surface. The pressure strips are made of thin polymer films and the strip geometry can be customized for nearly seamless fitting to the test object. Tiny micro-channels in the pressure strip propagate the pressure from the tap to the connected pressure scanner. Manufacturing processes have been developed successfully using laser and micro-milling to produce strips with comparatively deep channels. Laser fabrication has the advantage that it can produce channels in soft materials such as silicone or soft PVC, thus increasing the flexibility of the strip significantly without having to reduce the thickness of the strip. On the other hand, channels can be manufactured approximately 5 times faster using micro-milling.

The base material with milled or laser ablated channels is laminated with transparent adhesive tape in order to obtain sealed channels.

Pad Technology

The above disclosed strip technology is particularly suitable for wind tunnel testing. For full-scale experiments, with the same objective of translating the pressure from the location of interest to the scanner that effectively realizes the measurement it is preferred to implement the pad technology.

In addition to the general requirements of least airflow disturbance, the pad technology was developed for limiting the increase of stiffness to sails and to guarantee an adequate layout for differential pressure measurements. These necessities lead to the use of standard silicon tubing, not directly attached to the sail to carry the pressure, and of spot components as terminal points of the tubes, namely "pressure pads" (FIG. 2), located on the measurement sections.

Figure 2:
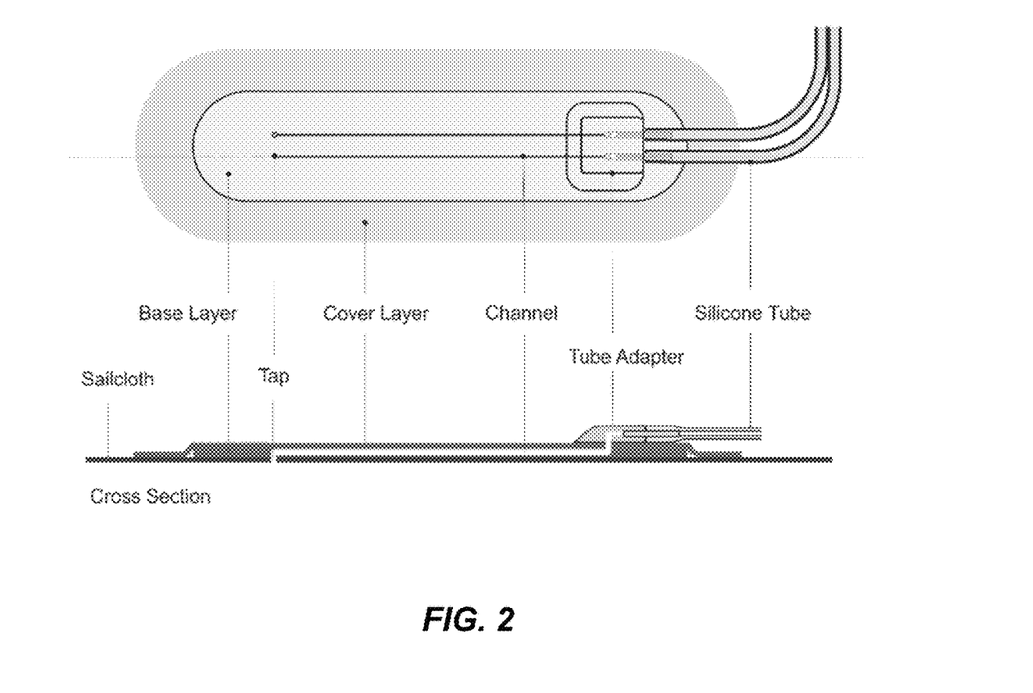
FIG. 2 shows an embodiment of a pressure pad.

These pads, which can be individually placed on the sail, contain two main taps on one extremity and a pressure tube adapter with two metal tubes of suitable diameter, as for example 1 mm diameter, on the other. In order to measure differential pressures, one tap faces to the windward and one to the leeward side of the sail. Since the pad is attached to one side of the sheet only, it is indispensable to make a hole in the sail directly beneath the respective tap in order to get access to the airflow on the other side. Although very small (for example 0.8 mm diameter), the holes are permanent on sails; therefore, once instrumented, they remain so for the rest of their operative life.

The pads are made of a base layer in Mylar or PET with an exemplary thickness of 0.5 mm and of a cover layer in transparent adhesive tape of, for example, 0.3 mm, resulting in a non-invasive maximum height above the sail of, such as 0.8 mm. The progressive overlapping of these two layers guarantees a smooth transition from the sail surface to the pad which results in almost no alteration of the airflow.

For calibration purposes, static measurements on a wing model are gathered for fixed incidence angles, for example ranging from −2 degrees to 14 degrees, at respectively 2.5 m/s, 5 m/s, 10 m/s, 15 m/s and 20 m/s wind speed. Other measurement parameters can be selected.

Figure 3:
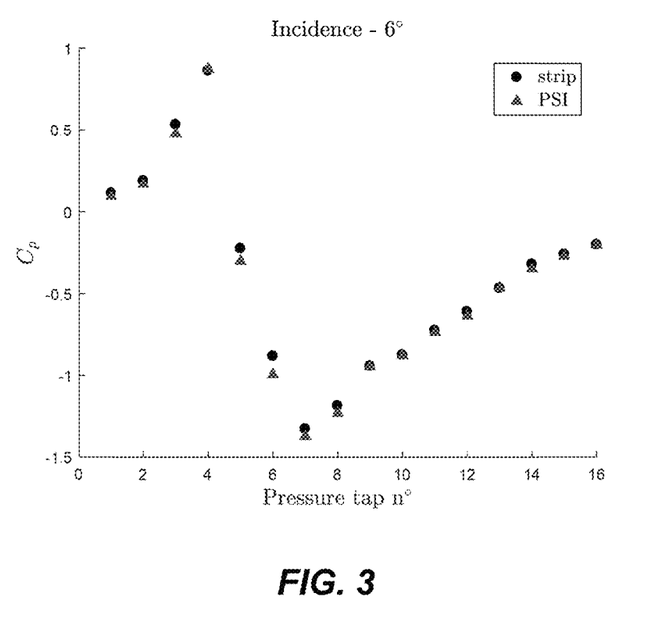
FIG. 3 shows pressure distribution along the airfoil for an angle of incidence of 6°.

For example, in FIG. 3, only the results for the wing model at 6 degrees of incidence, are reported. The data plotted in the graph are reduced in terms of pressure coefficient, defined as $$C_p = \frac{p - p_0}{\frac{1}{2}\rho V^2_\infty} \quad (1)$$

where p is the pressure on pressure tap, $p_0$ the reference pressure, $\rho$ the air density and $V^2\infty$ the wind speed of the incoming inflow.

It can be noticed that there is good agreement between pressure taps data and the pressure strip data, except for a few points near the airfoil leading edge, where the airfoil has strong curvature. In this region the strip installation, even though executed with particular accuracy, presents some tiny surface deformations—visible as small air bubbles around the pressure taps next to the leading edge—which are the main source of the differences.

Dynamic Response

The dynamic capabilities of the pressure strips are verified as follows. A truck hooter has been utilized as pressure wave generator, driven by a signal generator and an amplifier. The pressure measurements were taken by the means of two CSEM pressure scanners: one with a pressure port connected directly to the pressure wave source by a very short tube, the second with a pressure port connected to the strip channel under test in the same way to be used during the wind tunnel testing.

Two tubes of the same length were adopted to connect the scanner and the strip channel to be tested. In such a way it can be reasonably assumed that the pressure wave measured near the source has the same amplitude and phase of the pressure wave reaching the pressure tap on the strip. The connection and the sealing of the tube on the strip was done by means of modeling clay.

Figure 4:
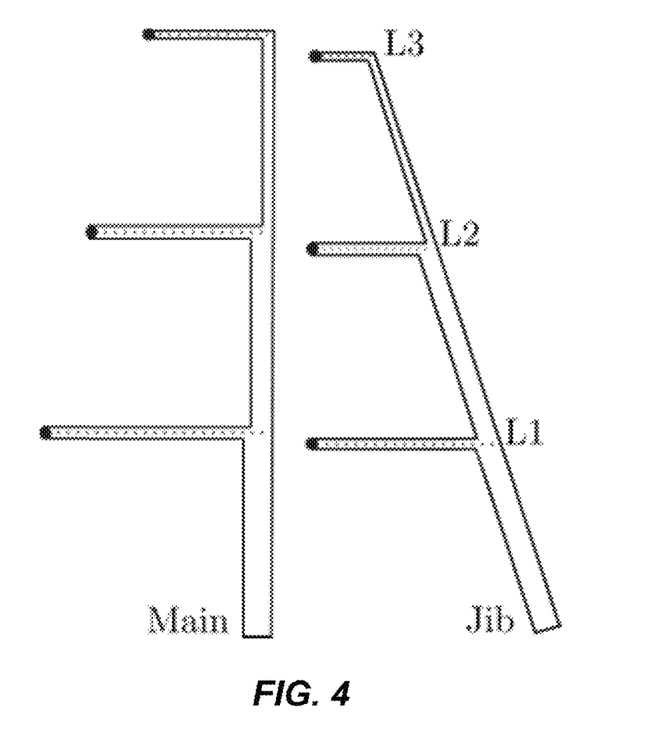
FIG. 4 shows the positions of an exemplary setting of pressure taps both on the mainsail and the jib strip.

Measurements were carried out on the pressure taps connected with the longest channel of each pressure tap array (bottom, middle, top) both on the mainsail and the jib strip (circles in FIG. 4).

The tests were conducted generating single tone sinusoidal pressure waves and sinusoidal sweeps in the frequency range 0-3 Hz the expected frequency range for this phenomenon. The pressure data acquisition was started simultaneously on the two scanners. The choice behind the characterization of the pressure system within this frequency range, is consistent with the interest of investigating the physics of slow varying aerodynamic phenomena connected to the sailing yacht motion, due the combined wind and wave loading. The full-scale cutoff frequency of this range is approximately 2 Hz [9]. Frequencies higher than this range (e.g. turbulence) are not expected to have any relevant influence on the overall dynamics of the boat, in that it represents a mechanical low pass filter.

Figure 5:
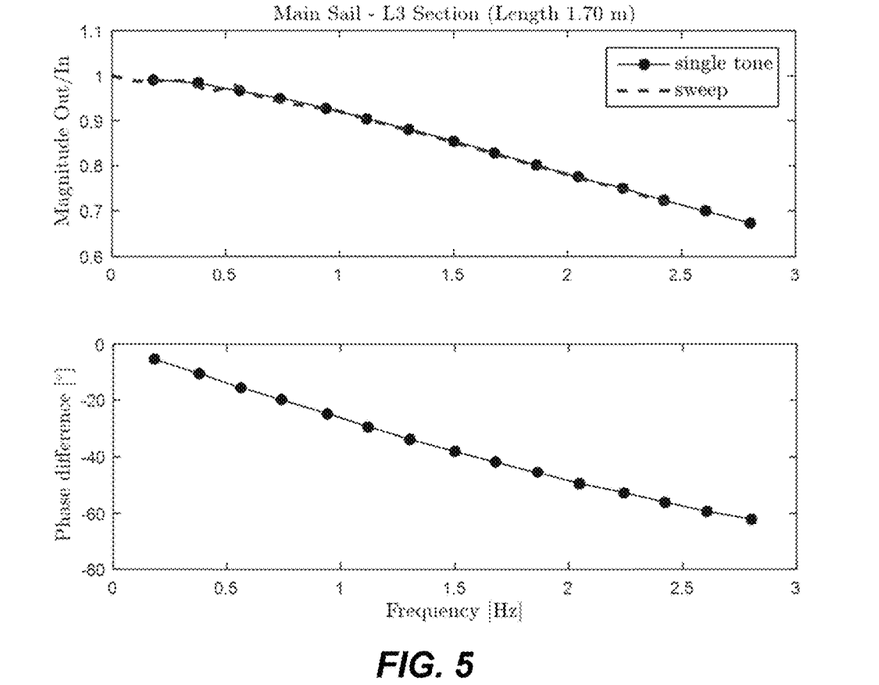
FIG. 5 shows dynamic response of the pressure tap on the top array of the mainsail.

For the sake of simplicity, only the results obtained for the pressure tap on top array of the mainsail (left) are shown in FIG. 5.

The obtained results agree with the expected ones for channels with a small section and comparable length. As it can be noticed from Error! Reference source not found., the linear trend in the output/input relative phase means a constant shift of the signal in phase (i.e. angular coefficient of the straight line in the frequency graph, so that the time history can be easily and consistently corrected during the post-processing procedures.

Wind Tunnel Tests

As exemplary embodiment of the present invention, a wind tunnel test is disclosed hereinbelow.

Test Apparatus, Program, and Procedure

Tested model was a complete 1:10 scale model of a 48' cruiser-racer, consisting of yacht hull body (above the waterline) with deck, mast, rigging and sails. The model was installed on the wind tunnel turntable in order to change AWA (apparent wind angle) during the tests.

The large size of the section enables yacht models of quite large size to be used, so that the sails are large enough to be made using normal sail making techniques. Moreover, the model can be rigged using standard model yacht fittings, commercially available, that can be used to trim the sails as in real operating condition. The sheet trims are controlled by the sail trimmer who operates from the wind tunnel control room with a 7 multi-turn control knobs that allow winch drum positions to be recorded and re-established if necessary. During these tests standard set up permits to measure aerodynamic forces and sails shapes.

Aerodynamic forces were measured by a six components balance placed inside the yacht hull. The balance connects the model to the ground and it is completely covered by the hull.

Sails shapes were measured by a novel sail flying shape detection system, based on Time of Flight technology (TOF).

The test procedure was set to characterize the aerodynamic behavior of a sail plan at fixed heel and apparent wind angle. The sail trimmer acts on the control system to obtain the desired sails regulation. In order to properly trim he can use some cameras placed onboard the model to give a view similar to the real life and the aerodynamic forces signals available in real time.

The new pressure measurements system was tested together with the standard instrumentation in order to test the system capability and to deeply understand how the flow around sails changes as a function of the given trim. Both mainsail and jib were equipped with custom-made pressure strips, each providing three test sections and a total of 40 pressure taps. Wind tunnel pressure set up was realized to measure pressure distributions on both sides of the sails, whereas in the full scale set up only differential pressure could be measured, for the intrinsic difficulty in the definition of a reference pressure signal in the real operating environment: this set up permits to better investigate the flow field around the sail, more in detail than it would be possible for full scale measurements.

Flying Shape Detection

During the present wind tunnel campaign, a sail flying shape detection system, based on Time of Flight technology (TOF), was adopted to perform shape measurements along with pressure and force data, as in the full scale final system [see WO2016/050701]; therefore, a master software was programmed to trigger synchronously the acquisition of all devices. A thorough explanation of this TOF novel technology can be found in [11]. Basically, a laser pulse is emitted by the TOF sensor and by measuring the time the pulse takes to hit the target surface and to come back to the receiver, it is possible to estimate the target distance.

Figure 6:
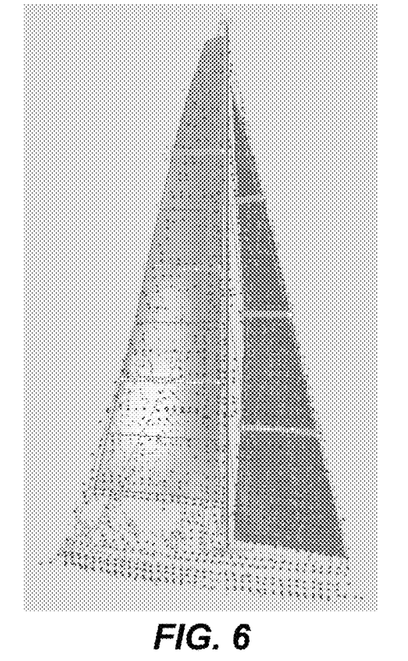
FIG. 6 shows an example of a point cloud acquired for mainsail (right) and jib (left): 3D reconstruction sail shapes and highlighted sections in correspondence of the pressure strips.
Figure 7:
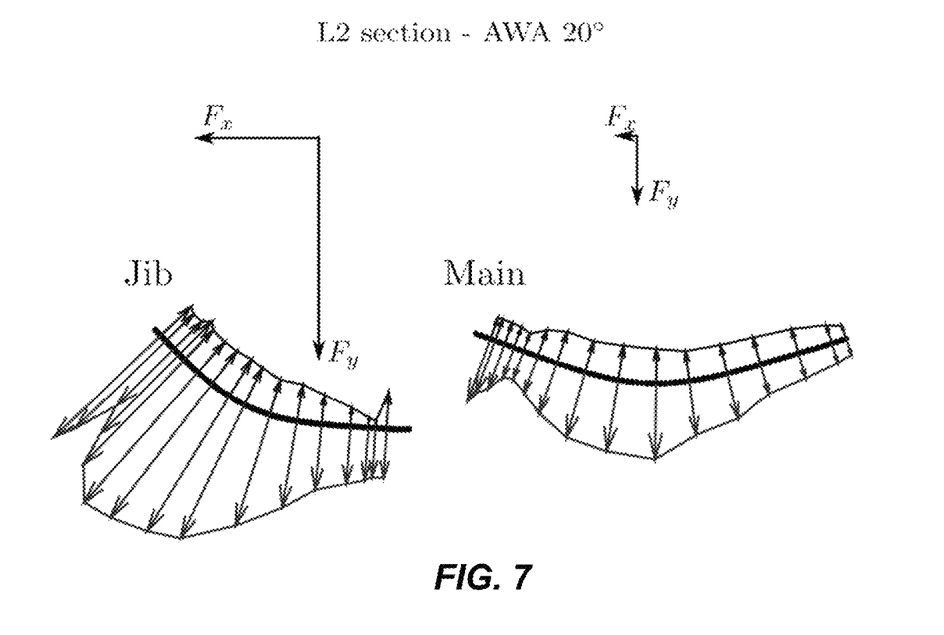
FIG. 7 shows visual pressure distribution on the sail plan based on measurements at section L2, AWA 20°.

The device performs measurements in terms of spatial coordinates of thousands of points belonging to the sail surface without impairing its shape since no contact occurs between object and sensor. These data, coming singularly from two different laser scanners, one for main sail and the other for jib (or gennaker) are then processed together to reconstruct the 3D sail surfaces (Error! Reference source not found.6), which can be sectioned in correspondence to the pressure strip heights allowing to compare pressure distribution against sail shape (FIG. 7).

Upwind Sails Tests and Results

Pressure measurements system was tested in upwind conditions for different trims and different angles of attack. The reliability of the measurements was verified doubling a few measurement points which were measured by the new system and the certified wind tunnel system, simultaneously. These tests confirmed the results obtained during calibration procedure.

From a scientific point of view pressure measurements permitted to understand how aerodynamic forces were generating by sails with particular attention to the correlation between sails trim and performances in terms of driving force.

Figure 8:
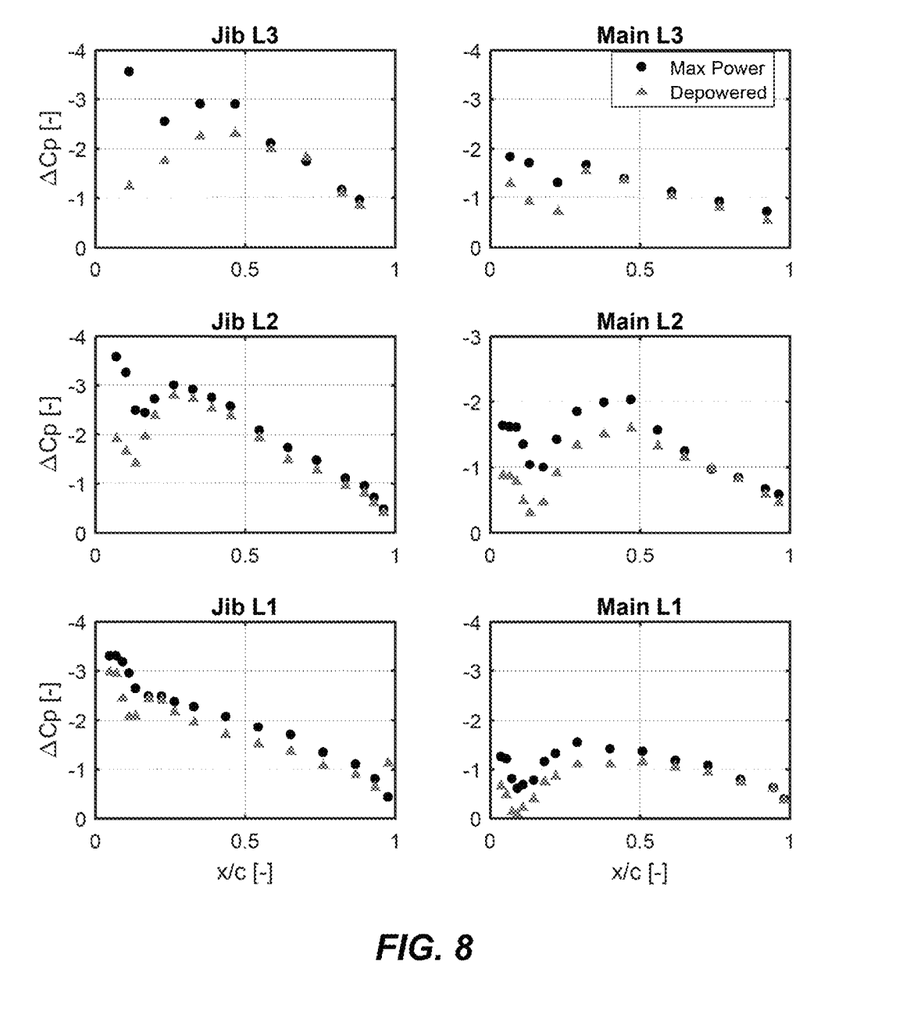
FIG. 8 shows the comparison of the pressure distributions (differential values between the two sides of each sail) of two configurations both considered at AWA 25°

FIG. 8 reports as an example pressure distributions obtained during tests at AWA 25°. The reported differential pressures coefficients are relative to two different sails trim, one related to high performances conditions (max power) and the other obtained with a less efficient trim of the mainsail. This figure suggests a few interesting comments about the aerodynamics behind: analyzing singularly the pressure coefficients of the main sails it can be easily seen that the trend is of an increase in the pressure coefficient nearby the main sail's leading edge, where the mast is placed, associated to a separation bubble, which has been documented in the past [13]. It is also possible to note that, the less efficient trim of the sail plain, obtained by sheeting differently only the main sail, shows different pressure distributions also on the jib: this strongly affects aerodynamic forces measured on the sail plan.

More specifically, for worse trimming of the sail, the aerodynamics of the jib is modified in the sense that the suction effect of the main gets weaker leading to a different lifting attitude of the jib as well.

Full Scale Pressure System Layout

According to the present invention, the pressure distribution on the sails is carried out by means of specifically designed pressure pads which have been designed and produced aiming to provide the differential measurement between the sail leeward and windward side. So that the above reported metrological characterization on the strips and the wind tunnel tests were mainly to assess the capabilities of the measuring system, in advance with respect the final full scale implementation with pads. However, during the wind tunnel tests some tests on pads themselves were conducted just to verify the expected functioning.

Figure 9:
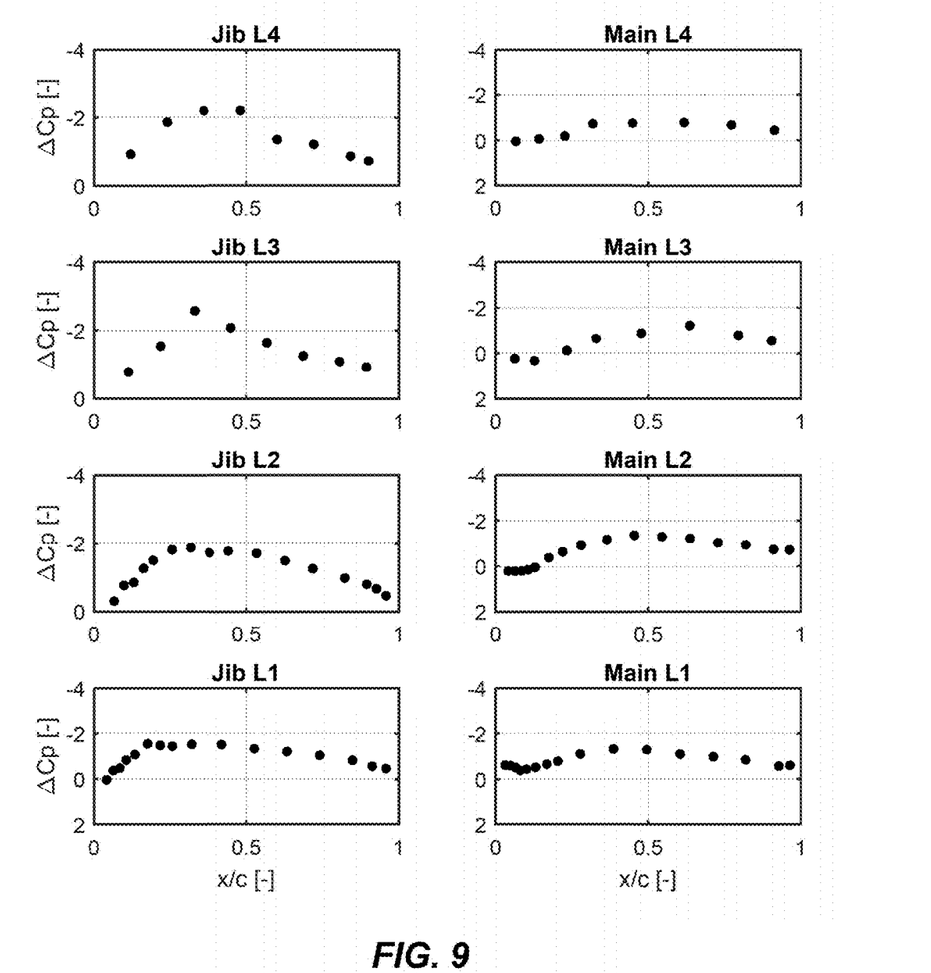
FIG. 9 shows the pressure distributions (differential values between the two sides of each sail) measured full scale at about AWA 25°

FIG. 9 shows as an example pressure distributions obtained during tests at about AWA 25°. Comparing these results with the ones obtained from wind tunnel tests it is possible to note similar trends and values, with differences at the leading edge due to differences in the realized sails trim.

Figure 10:
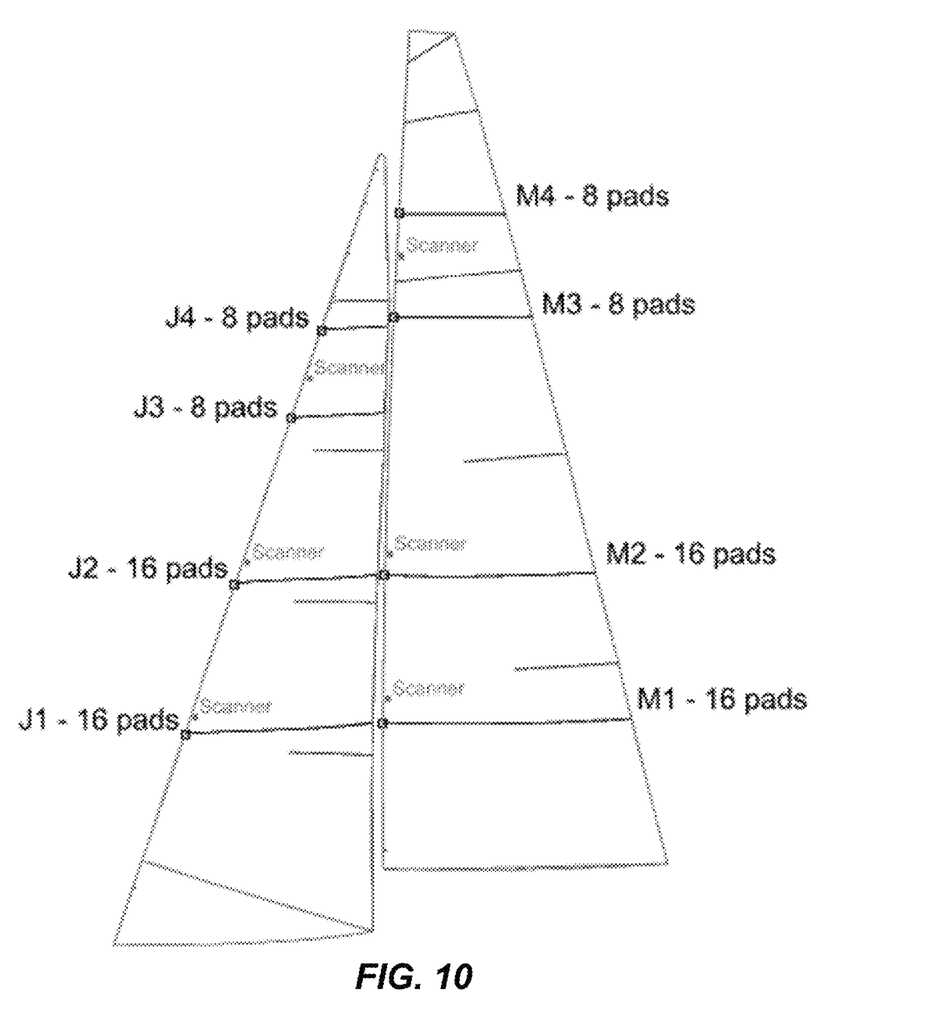
FIG. 10 shows exemplary embodiment of full scale mainsail and jib pressure taps layout.
Figure 11:
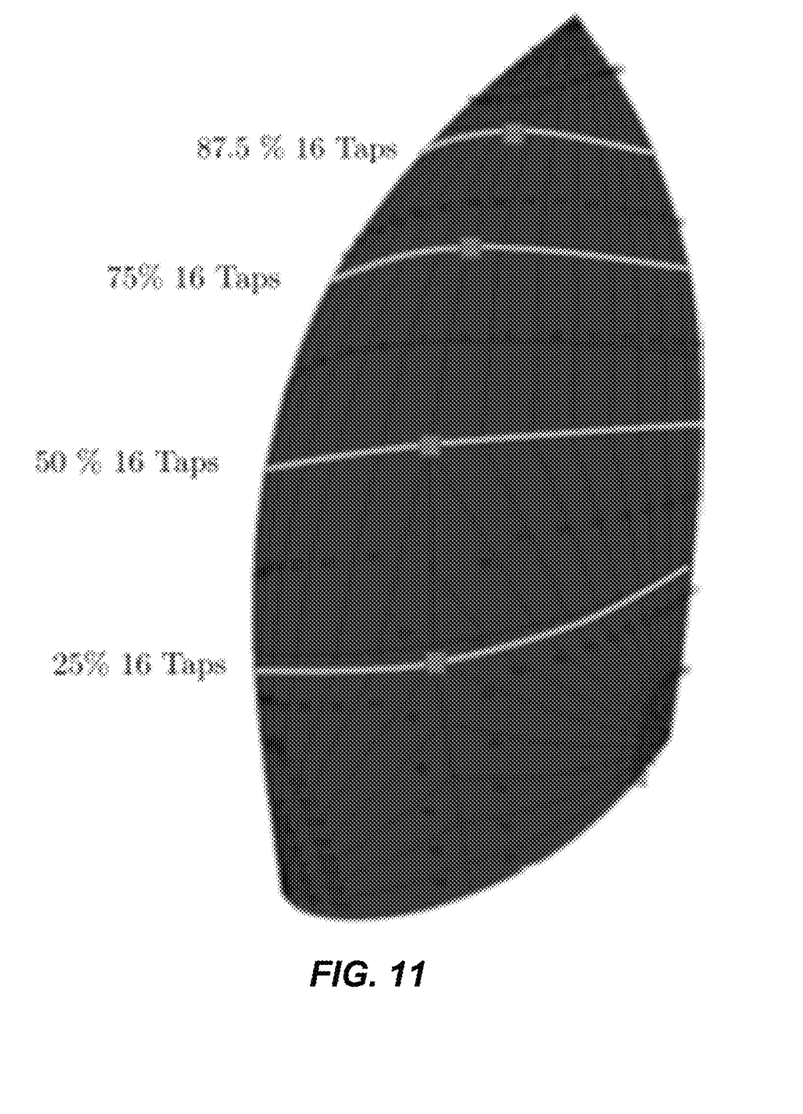
FIG. 11 shows exemplary embodiment of full scale gennaker pressure taps layout.

According to an embodiment of the present invention, Error! Reference source not found. and Error! Reference source not found.11 show the proposed sail pressure measurement system, the sections considered and a relevant number of pressure taps for the complete sail plane.

The capabilities of the device of the present invention were evaluated through a metrological validation of the system alone (static and dynamic tests) and through wind tunnel tests in upwind and downwind configuration. In another embodiment of the present invention, the pressure system was integrated in the existent set up, in particular together with the flying shape detection based on Time of Flight (TOF) technology, as disclosed in WO/2016/050701.

Wind tunnel tests allowed both to check the reliability of the new system and to investigate thoroughly upwind soft sails aerodynamics, with the possibility of carrying out regulation as in real navigation. During wind tunnel test session, each side of the sail pressure distributions were measured with reference to a common static pressure, by means of pressure strips, whereas for full scale implementation, pressure pads for differential measurements were developed.

Wind tunnel results give a promising sight of the potentiality of the system described in explaining the dependency of sail plan aerodynamics on the sails trimming, relying on the combined measurements of forces, pressures and flying shapes.

Furthermore, these measurements will represent a great reference database for validation of CFD codes and can be used to complete the interpretation of full scale results.

REFERENCES

[1] Viola, I. M., Flay, R. G. J., "On-water pressure measurements on a modern asymmetric spinnaker", in 21st *HISWA Symposium on Yacht Design and Yacht Construction*, Amsterdam, 2010.

[2] Deparday, J., Bot, P., Hauville, F., Motta, D., Le Pelley, D. J., Flay, R. G. J., Dynamic measurements of pressures, sail shape and forces on a full-scale spinnaker, in 23rd HISWA Symposium on Yacht Design and Yacht Construction, Amsterdam, 2014

[3] Motta, D., Flay, R. G. J., Richards, P., Le Pelley, D. J., Bot, P., Deparday, J., An investigation of the dynamic behavior of asymmetric spinnakers at full-scale, in 5th High Performance Yacht Design, Auckland, 2015

[4] Pot, P., Viola, I. M., Flay, R. G. J., Brett, J. S., Wind-tunnel pressure measurements on model-scale rigid downwind sails, Ocean Engineering, 90, pp. 84-92, 2014

[5] Viola, I. M., Flay, R. G. J., "Sail pressures from full-scale, wind-tunnel and numerical investigations", *Ocean Engineering*, 38 (16), pp.1733-1743, 2011.

[6] Lozej, M., Golob, D., Bokal, D., "Pressure distribution on sail surfaces in real sailing conditions", in 4*th High Performance Yacht Design Conference*, Auckland, pp. 242-251, 201, 2012.

[7] Le Pelley, D., Morris, D., Richards, P., "Aerodynamic force deduction on yacht sails using pressure and shape measurements in real time", in 4*th High Performance Yacht Design Conference*, Auckland, pp. 28-37, 2012.

[8] Motta, D., Flay, R. G. J., Richards, P. J., Le Pelley, D. J., Deparday, J., Bot, P., "Experimental investigation of asymmetric spinnaker aerodynamics using pressure and sail shape measurements", *Ocean Engineering*, 90, pp. 104-118, 2014.

[9] Motta, D., Flay, R. G. J., Richards, P. J., Le Pelley, D. J., Deparday, J., Bot, P., "Experimental investigation of asymmetric spinnaker aerodynamics using pressure and sail shape measurements", *Ocean Engineering*, 90, pp. 104-118, 2014.

[10] Fossati, F., Muggiasca, S., Maria, I., Zasso, A. Wind tunnel techniques for investigation and optimization of sailing yachts aerodynamics (2006) 2nd High Performance Yacht Design Conference 2006, pp. 105-113.

[11] Fossati F., Mainetti G., Sala R., Schito P., Vandone A., "Offwind Sail Flying Shapes Detection, 5th, High performance Yacht Design Conference, Auckland, 2015.

[12] Fossati, F., Muggiasca, S., Martina, F. Experimental database of sails performance and flying shapes in upwind conditions, in INNOVSAIL International Conference on Innovation in High Performance Sailing Yachts, Lorient, RINA, pp. 99-114, 2008.

[13] Abbott H., Doenhoff E., Theory of Wing Sections: Including a Summary of Airfoil Data, Dover Publications, Inc. New York, 1959.

[14] Abbott H., Doenhoff E., Theory of Wing Sections: Including a Summary of Airfoil Data, Dover Publications, Inc. New York, 1959.

The invention claimed is:

1. A system for measuring wind or air pressure on a sail comprising:
   (a) at least one pressure scanner positioned to at least: take a reference pressure in an area of undisturbed air or wind flow, or directly measure differential pressures between windward and leeward sides of the sail;
   (b) at least one pressure sensor positioned in direct contact with the sail; and
   (c) a device for connecting said at least one pressure scanner to said at least one pressure sensor positioned in direct contact with the sail,
   wherein the device comprises a pneumatic device,
   and optionally said pneumatic device comprises a pressure strip.

2. The system according to claim 1, wherein said pressure scanner a) comprises an electronic scanner, optionally a miniaturized electronic pressure scanner, optionally in a waterproof package.

3. The system according to claim 2, wherein said electronic scanner comprises a plurality of differential pressure sensors and a Controller Area Network bus interface for communication of commands for integrating the unit into an instrumentation system, and optionally the commands are remote commands.

4. The system according to claim 3, wherein said differential pressure sensors comprise piezo-resistive differential low-pressure dies.

5. The system according to claim 2, wherein said electronic scanner comprises a Micro-Electro-Mechanical System (MEMS) pressure die.

6. The system according to claim 1, wherein said pressure sensor b) comprises a pressure pad.

7. The system according to claim 1, wherein said pressure strip c) is made of, or comprises a polymer film.

8. The system according to claim 6, wherein said pressure pad comprises at least two pressure taps on one end of said pad and a pressure tube adapter with two metal tubes on the other end.

9. The system of claim 3, wherein said plurality of differential pressure sensors comprises at least 16 differential pressure sensors.

10. The system of claim 3, wherein said plurality of differential pressure sensors each has its own reference input to make the pressure scanner able to measure pressure differences between leeward and windward sides on dedicated spots on the sails.

11. The system according to claim 1, wherein said pressure strip c) comprises microchannels.

12. The system according to claim 1, further comprising at least two pressure flange systems,
   wherein optionally a pressure flange system comprises a plurality of tubes, two tubes per said pressure sensor, one tube facing to a windward and one tube facing to a leeward side of the sail.

13. The system according to claim 1, further comprising a pressure adapter,
   wherein optionally the pressure adaptor is screwed to the scanner.

14. The system according to claim 13, wherein the pressure adapter provides 32 tubes, 2 per pressure sensor, one facing to a front side and one to a reference side of the sensor.

15. The system according to claim 13, wherein the pressure adapter combines all reference inputs to a single tube in order to connect all pressure sensors to a same reference.

16. The system according to claim 13, wherein the pressure adapter provides direct access to said pressure strips without the need of any tubes.

17. The system according to claim 13, wherein the at least one pressure scanner is contained in a box or a container.

18. The system according to claim 13, wherein the box or container containing the at least one pressure scanner further comprises a plug-in for a CAN cable that: supplies the pressure scanner with electrical power, allows remote access to scanner configuration commands; and/or transmits measurement data to a receiving computer.

* * * * *